US012377745B2

(12) United States Patent
Volk et al.

(10) Patent No.: US 12,377,745 B2
(45) Date of Patent: Aug. 5, 2025

(54) COMBINED HYDROGEN FUEL CELL FOR VEHICLE FUELING, ELECTRIC VEHICLE FAST CHARGING AND FUEL CELL BACK-UP POWER FORECOURT

(71) Applicant: GHD, INC., Phoenix, AZ (US)

(72) Inventors: James Joseph Volk, Clarence, NY (US); James M. Wenck, Pataskala, OH (US); Fred Taylor, Cambridge (CA)

(73) Assignee: GHD, INC., Phoenix, AZ (US)

( * ) Notice: Subject to any disclaimer, the term of this patent is extended or adjusted under 35 U.S.C. 154(b) by 858 days.

(21) Appl. No.: 17/574,840

(22) Filed: Jan. 13, 2022

(65) Prior Publication Data
US 2022/0227247 A1     Jul. 21, 2022

Related U.S. Application Data

(60) Provisional application No. 63/139,952, filed on Jan. 21, 2021.

(51) Int. Cl.
*B60L 53/54* (2019.01)
*B60L 50/70* (2019.01)
(Continued)

(52) U.S. Cl.
CPC .............. *B60L 53/54* (2019.02); *B60L 50/70* (2019.02); *H01M 8/04201* (2013.01);
(Continued)

(58) Field of Classification Search
CPC .... B60L 53/54; B60L 50/70; H01M 8/04201; H01M 2250/20; H01M 2250/402; C25B 1/04
(Continued)

(56) References Cited

U.S. PATENT DOCUMENTS 6,522,955 B1   2/2003   Colborn
6,745,799 B1   6/2004   Fuglevand
(Continued)

FOREIGN PATENT DOCUMENTS

KR   10-2228132   3/2021
WO   2020062956   4/2020
WO   2022159338   7/2022

OTHER PUBLICATIONS

UKIPO; United Kingdom Examination Report dated Sep. 15, 2023 in Application No. GB2213886.1.
(Continued)

*Primary Examiner* — Hal Kaplan
(74) *Attorney, Agent, or Firm* — SNELL & WILMER, L.L.P.

(57) ABSTRACT

The system may comprise a Proton Exchange Membrane Fuel Cell (PEM FC) stack that is connected to and provides energy to a microgrid for back-up applications, is connected to and provides energy to a fast-charge battery electric vehicle station (BEV) for fast charging of Electric Vehicles (EVs) and is connected to and provides hydrogen to a hydrogen dispenser for fueling Fuel Cell Vehicles (FCVs). Utilizing an integrated forecourt to support several different energy delivery applications and technologies may result in improved overall project economics and may accelerate the transition to a low/zero carbon economy for transportation and stationary back-up power.

20 Claims, 2 Drawing Sheets

(51) Int. Cl.
  *C25B 1/04* (2021.01)
  *H01M 8/04082* (2016.01)
(52) U.S. Cl.
  CPC .......... *C25B 1/04* (2013.01); *H01M 2250/20* (2013.01); *H01M 2250/402* (2013.01)
(58) Field of Classification Search
  USPC .......................................................... 307/43
  See application file for complete search history.

(56) References Cited

U.S. PATENT DOCUMENTS

| | | | |
|---|---|---|---|
| 7,105,946 | B2 | 9/2006 | Akiyama et al. |
| 7,116,010 | B2 | 10/2006 | Lasseter et al. |
| 7,119,458 | B2 | 10/2006 | Barnes et al. |
| 7,181,316 | B2 | 2/2007 | Fairlie et al. |
| 7,250,231 | B2 | 7/2007 | Edlund |
| 7,413,585 | B2 | 8/2008 | Da Silva et al. |
| 7,535,118 | B2 | 5/2009 | Ikuma et al. |
| 7,880,334 | B2 | 2/2011 | Evans et al. |
| 7,977,000 | B2 | 7/2011 | Edlund |
| 8,003,268 | B2 | 8/2011 | Smith |
| 8,080,344 | B2 | 12/2011 | Skok et al. |
| 8,450,022 | B2 | 5/2013 | Skok et al. |
| 8,808,934 | B2 | 8/2014 | Wilson et al. |
| 8,906,529 | B2 | 12/2014 | Horne et al. |
| 9,490,660 | B2 | 11/2016 | Monahan et al. |
| 9,637,016 | B2 | 5/2017 | Gjinali et al. |
| 9,880,580 | B2 | 1/2018 | Darden, II et al. |
| 9,906,039 | B2 | 2/2018 | Vogel et al. |
| 10,381,952 | B2 | 8/2019 | Arnedo et al. |
| 10,541,433 | B2 | 1/2020 | Patel et al. |
| 10,596,919 | B2 | 3/2020 | Srinivasan et al. |
| 10,601,226 | B2 | 3/2020 | Gurunathan et al. |
| 10,629,931 | B2 | 4/2020 | Mai et al. |
| 10,759,285 | B2 | 9/2020 | Tanaka et al. |
| 10,814,734 | B2 | 10/2020 | Gjinali et al. |
| 10,862,301 | B2 | 12/2020 | Teichmann et al. |
| 10,998,724 | B1 | 5/2021 | Donahue et al. |
| 11,135,931 | B2 | 10/2021 | Martin et al. |
| 11,152,814 | B2 | 10/2021 | Martin et al. |
| 2003/0164202 | A1 | 9/2003 | Graham et al. |
| 2004/0199294 | A1 | 10/2004 | Fairlie et al. |
| 2007/0042241 | A1 | 2/2007 | Matsuo et al. |
| 2008/0217998 | A1* | 9/2008 | Parmley .................. H02J 7/35 307/65 |
| 2017/0207745 | A1 | 7/2017 | Ishihara et al. |
| 2020/0182405 | A1 | 6/2020 | Van Lookeren Campagne |
| 2021/0218043 | A1 | 7/2021 | Ardanese et al. |
| 2021/0261010 | A1 | 8/2021 | Pickles et al. |
| 2021/0380008 | A1 | 12/2021 | Martin et al. |

OTHER PUBLICATIONS

GB; Examination Report dated Nov. 16, 2022 in Application No. GB2213886.1.
Richardson, et al, "Low-cost, Transportable Hydrogen Fueling Station for Early FCEV Adoption." University of Nebraska, Economics Faculty Publications, Jul. 2015 (Jul. 2015), pp. 4-6.
PCT; International Report on Patentability dated Jul. 20, 2022 in PCT Application PCT/US2022/012424.
AU; First Examination Report dated Nov. 28, 2022 in Application No. 2022211781.
CIPO, Notice of allowance dated Feb. 1, 2023 in Canadian Application No. 3,173,430.
AUIPO, Notice of Acceptance dated Feb. 8, 2023 in Australian Application No. 2022211781.
PCT; International Search Report and Written Opinion dated Apr. 13, 2022 in Application No. PCT/US2022/012424.
Richardson et al., "Low-cost, Transportable Hydrogen Fueling Station for Early FCEV Adoption." University of Nebrasca, Economics Faculty Publications, Jul. 2015 (Jul. 2015), pp. 4-6, [online]digitalcommons.unomaha.etud/econrealostatefacpub/15/?utm_source=digitalcommons.unomaha.edu%2Econrealestatefacpub%2F15&utm_medium=PDF&utmcampaign=PDFCoverPages.
General Motors Company, "News Release Details: GM Plans to Broaden Electrification, Expanding Fuel Cells Beyond Vehicles", https://investor.gm.com/news-releases/news-release-details/gm-plans-broaden-electrification-expanding-fuel-cells-beyond#:~:text=GM%20will%20combine%20its%20fuel,a%20temporary%20need%20for%20power, Wed, Jan. 19, 2022, pp. 1-5.

* cited by examiner

COMBINED HYDROGEN FUEL CELL FOR VEHICLE FUELING, ELECTRIC VEHICLE FAST CHARGING AND FUEL CELL BACK-UP POWER FORECOURT

CROSS-REFERENCE TO RELATED APPLICATIONS

This application claims priority to and the benefit of U.S. Provisional Application Ser. No. 63/139,952 filed Jan. 21, 2021 and entitled "Combined Hydrogen Fuel Cell For Vehicle Fueling, Electric Vehicle Fast Charging and Fuel Cell Back-Up Power Forecourt," which is incorporated herein by reference in its entirety for all purposes.

FIELD

This disclosure generally relates to multiple uses for hydrogen fuel cells, and more particularly, to an integrated infrastructure that supports a microgrid for back-up applications and a shared fueling forecourt for fast charging of Electric Vehicles (EVs) and hydrogen fueling of Fuel Cell Vehicles (FCVs).

BACKGROUND

Different types of charging stations and microgrids are supplied by separate power generation systems. Each system requires separate equipment, separate energy storage devices, separate interconnected piping, separate instrumentation, separate controls, and separate electrical components for the different fueling and power generation applications. Such separate systems require an increase in costs to create separate systems, an increase in costs to operate separate systems, an increase in maintenance, an increase in monitoring and an increase carbon emissions. The separate systems may also require a larger footprint.

In general, a Proton Exchange Membrane Fuel Cell (PEM FC) may operate in the following way. The PEM FC typically uses hydrogen since hydrogen has one proton and one electron. The platinum catalyst on the face of the PEM Fuel Cell separates the hydrogen into protons and electrons. The proton may travel through the fuel cell stack material, but the electron is not able to travel through the fuel cell stack. Instead, the electron passes around the fuel cell stack and creates an electrical current, similar to that of a battery. The protons and electrons merge back together with oxygen (e.g., air) at the other side of the fuel cell stack and form water: $2H_2+O_2=2H_2O$. The water is in the form of water vapor, so the water vapor is typically lost to the atmosphere. The power produced by the fuel cell is instantaneous, in that as soon as H2 is introduced, the fuel cell generates power.

An independent microgrid may be used to provide energy for a grid or other services in case of emergencies and to provide energy for back-up applications. A microgrid may connect to a local resource that does not provide enough energy or a local resource that is too unreliable for traditional grid use. A microgrid often allows communities or entities to reduce costs, to be more energy independent and to be more environmentally friendly. Microgrids may be controlled by local users and help them create energy independence. A microgrid can power a single facility or a large area (e.g., a city or a corporate headquarters). A microgrid may include a remote microgrid, grid-connected microgrid or networked microgrid. Microgrids can help deploy more zero-emissions energy sources, make use of waste heat, reduce energy lost through transmission lines, help manage power supply and demand, and improve grid resilience to extreme weather. Microgrids can also help with power availability and offer cost control and predictability.

A DC microgrid is typically a local power system that generates and uses its own DC power, so it runs independently of the main power grid. Typical methods of generating power for DC microgrids include the use of solar panels, fuel cells, and/or wind turbines. The excess energy that may be generated may be stored in batteries.

A charging system may include an independent AC charger that typically provides power to a power inverter within an automobile, and the automobile power inverter converts that AC power to DC power in order to be able to be accepted by the battery. The acceptance rate of the automobile charger may be limited based on cost, space and weight. The time to charge a battery typically depends on the vehicle being charged, but fully charging an electric vehicle at Level 2 my take 4-12 hours.

Another charging system may include DC Fast Charging that greatly increases the charging speed compared to an AC charger by bypassing the limitations of the automobile charger and required power inverter conversions, and instead by providing DC power directly to the battery. Charging times are mainly dependent on the battery size and the output of the dispenser, but many vehicles are capable of getting an 80% charge in under an hour using most currently available DC fast chargers. An independent DC fast charging station may charge an electric vehicle at a rate of 3 to 20 miles per minute. DC fast charging stations are often used when recharging speed is critical during long distance travel.

A further charging system may include the charging of Fuel cell vehicles (FCVs) that are powered by hydrogen. The FCVs only emit water vapor and warm air, without producing any tailpipe emissions, so the FCVs may be more efficient than traditional internal combustion engine vehicles. The most common type of fuel cell for vehicle applications is the proton exchange membrane (PEM) fuel cell. In a PEM fuel cell, a positive electrode (cathode) and a negative electrode (anode) surround an electrolyte membrane. Hydrogen is introduced to the anode, and oxygen (typically from the air) is introduced to the cathode. Due to an electrochemical reaction in the fuel cell catalyst, the hydrogen molecules break apart into protons and electrons. The protons then travel through the membrane to the cathode. The electrons are forced to travel through an external circuit to provide power to an external device (e.g., the electric car), then re-combine with the protons on the cathode side where the protons, electrons, and oxygen molecules combine to form water.

SUMMARY

In various embodiments, the system may comprise one or more Proton Exchange Membrane Fuel Cell (PEM FC) stacks that are connected to and provide energy to one or more microgrids for back-up applications, that are connected to and provide energy to one or more fast-charge battery electric vehicle stations (BEV) for fast charging of Electric Vehicles (EVs) and that are connected to and provide hydrogen to one or more hydrogen dispensers for fueling Fuel Cell Vehicles (FCVs).

In various embodiments, the system may further comprise one or more electrolyzer that is connected to the PEM FC, wherein the electrolyzer is configured to produce the hydrogen. The system may further comprise one or more power sources that are connected to the electrolyzer, wherein the one or more power sources are configured to supply energy to the electrolyzer, and wherein the power sources include at least one of wind, solar and hydroelectric. The system may further comprise a low-pressure compression unit that is connected to the PEM FC, wherein the low-pressure compression unit is configured to supply the hydrogen to the PEM FC. The system may further comprise a low-pressure compression unit that is connected to the PEM FC, wherein the low-pressure compression unit is connected to and configured to receive hydrogen from at least one of a hydrogen delivery tube trailer, an electrolyzer, a liquid hydrogen storage and vaporization unit, or a liquid hydrogen delivery unit. The system may further comprise a low-pressure compression unit that is connected to the PEM FC, wherein the low-pressure compression unit is connected to and configured to receive hydrogen from a liquid hydrogen storage and vaporization unit, and wherein a liquid hydrogen delivery unit is connected to and configured to provide hydrogen to the liquid hydrogen storage and vaporization unit. The system may further comprise a low-pressure hydrogen storage unit that is connected to the PEM FC, wherein the low-pressure storage unit is configured to supply the hydrogen to the PEM FC. The system may further comprise a low-pressure hydrogen storage unit that is connected to the PEM FC and a low-pressure compression unit, wherein the low-pressure storage unit is configured to receive hydrogen from the low-pressure compression unit and is configured to send hydrogen to the PEM FC. The system may further comprise a low-pressure hydrogen storage unit that is connected to the PEM FC and a high-pressure compression unit. The system may further comprise a low-pressure hydrogen storage unit that is connected to the PEM FC and a high-pressure compression unit, wherein the high-pressure compression unit is further connected to the hydrogen dispenser that is configured to dispense hydrogen to one or more FCVs.

In various embodiments, the PEM FC may be further configured to include an electrolyzer. The system may further comprise one or more power sources that are connected to the electrolyzer in the PEM FC, wherein the one or more power sources are configured to supply energy to the electrolyzer, and wherein the power sources include at least one of wind, solar and hydroelectric. The system may further include the electrolyzer being configured to perform electrolysis by using a power source to break down water into low-pressure hydrogen and oxygen to create hydrogen gas. The system may further comprise the PEM FC being configured to send low-pressure hydrogen to a low-pressure storage unit for storage. The system may further comprise the PEM FC being configured to receive low-pressure hydrogen from a low-pressure storage unit that stores the low-pressure hydrogen.

BRIEF DESCRIPTION OF THE DRAWINGS

The subject matter of the present disclosure is particularly pointed out and distinctly claimed in the concluding portion of the specification. A more complete understanding of the present disclosure may be obtained by referring to the detailed description and claims when considered in connection with the drawing figures, wherein like numerals denote like elements. Each of the various Figures and components may be in accordance with various embodiments of the disclosure.

DETAILED DESCRIPTION

Figure 1:
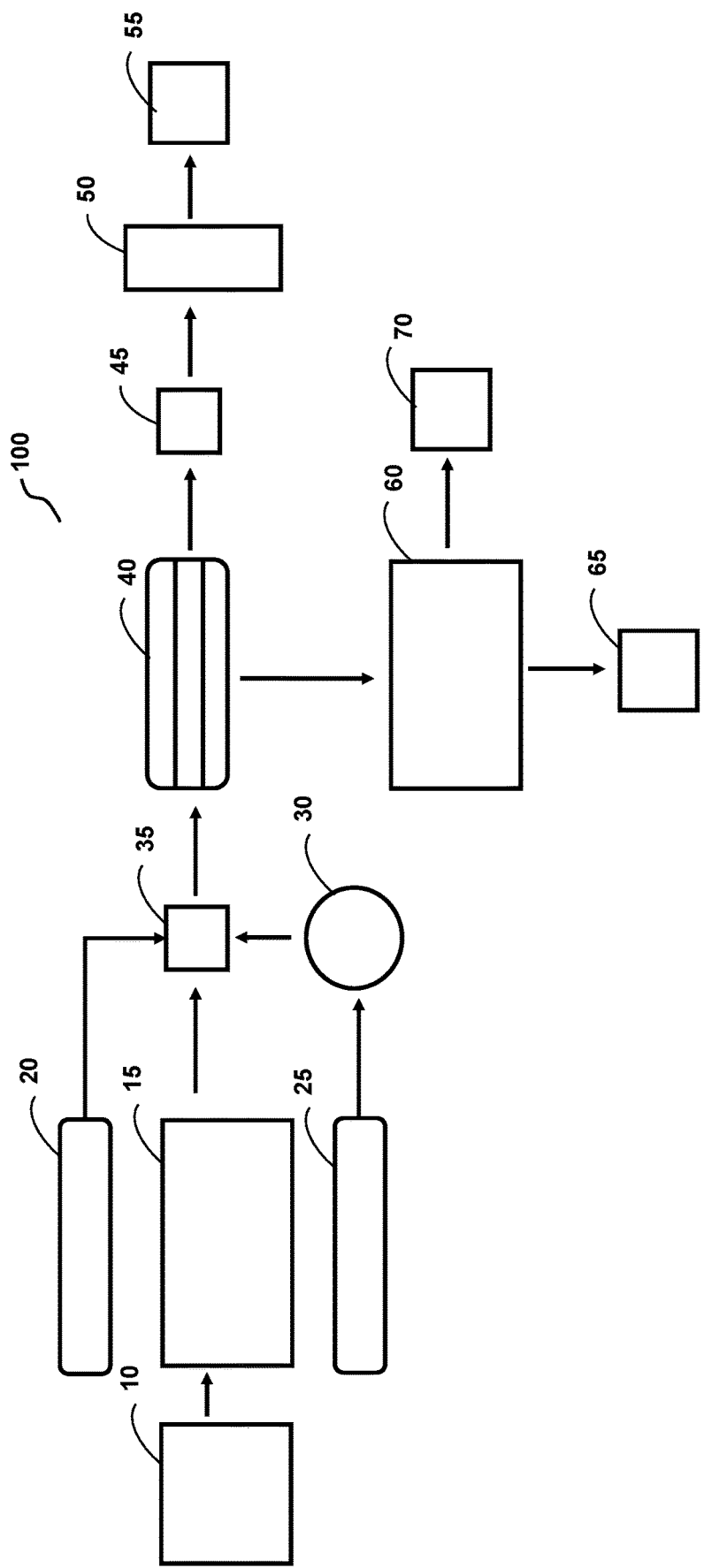
FIG. 1 shows an exemplary first arrangement of the system using an energy integration approach, in accordance with various embodiments.

In general, the system utilizes an integrated forecourt to support several different energy delivery applications and technologies. In various embodiments, and as set forth in FIG. 1, the system may include an integrated infrastructure that supports a microgrid for back-up applications and a shared fueling forecourt for fast charging of Electric Vehicles (EVs) and hydrogen fueling for Fuel Cell Vehicles (FCVs). Utilizing an integrated forecourt to support several different energy delivery applications and technologies may result in improved overall project economics and may accelerate the transition to a low/zero carbon economy for transportation and stationary back-up power. The system offers multiple energy vehicle charging and fueling solutions within a smaller footprint than multiple individual solutions. The integrated system provides for optimization of space and reduced cost to create the system. While individually these technologies may be used support distinct and separate applications, the system combines these technologies into an integrated forecourt arrangement that allows for the sharing and cost savings of critical equipment, energy storage devices, interconnected piping, instrumentation, controls, and electrical components for a variety of different fueling and power generation applications.

More particularly, the system 100 may include the power sources 10 with less carbon intense renewable energy resources such as, for example, hydro-electric, wind and/or solar for the on-site production of the hydrogen fuel/power source. The system may also experience energy savings by obtaining energy from the power sources 10 at off-peak times. In various embodiments, power sources 10 may be used by an electrolyzer 15 to produce hydrogen. The electrolyzer 15 may perform electrolysis by using one of the power sources to break down the water into low-pressure hydrogen and oxygen, thereby creating hydrogen gas. The electrolyzer 15 may also contain pumps, vents, storage tanks, separator and other sub-components.

In various embodiments, the system 100 may also use hydrogen at the site that is supplied from local sources. The cryogenic liquid hydrogen is hydrogen as a liquid at −423 degrees F. that is typically delivered via special trucks and pumped into storage tanks. Therefore, a special, highly insulated tank is used to store the cryogenic liquid until the liquid is being used. Storing the liquid hydrogen on site via the truck trailer would be too expensive since these truck containers are smaller than a tank and are a lot more expensive than a dedicated, larger stationary tank. As such, the system may provide for storing the hydrogen in a tank. The hydrogen may be supplied from a delivery tube trailer 20 and/or liquid hydrogen tank 25. A liquid hydrogen delivery unit 20 may be used in place of the delivery tube trailer 20. When supplied from the liquid hydrogen tank 25, the liquid hydrogen may be sent to a liquid hydrogen storage and vaporization unit 30. The liquid hydrogen storage and vaporization unit 30 vaporizes the liquid hydrogen. The hydrogen created by electrolysis from the electrolyzer 15, the hydrogen from the delivery tube trailer 20 and/or the vaporized hydrogen from the liquid hydrogen storage and vaporization unit 30 may be sent to a low-pressure compression unit 35. The low-pressure compression unit 35 may compress the hydrogen and send the compressed hydrogen to the low-pressure hydrogen storage unit 40. The hydrogen demand (typically KG/Day) required by the PEM FC or the hydrogen fueling system may determine the size of the low-pressure storage and the frequency at which the low-pressure hydrogen storage unit 40 is replenished by the low-pressure compression unit 35. The low-pressure hydrogen storage unit 40 may store the hydrogen and send the hydrogen to the high-pressure compression unit 45 to further compress the hydrogen into high-pressure hydrogen. The high-pressure compression unit 45 may operate when a fuel cell vehicle begins its fueling process. The fuel cell vehicle could require hydrogen pressures up to 700 Bar (10,000 psig). The high-pressure compression unit 45 may deliver this hydrogen to the hydrogen dispenser 50 at any time. In various embodiments, the high-pressure compression unit 45 may deliver this hydrogen to the hydrogen dispenser 50 on an as-needed basis (e.g., during each hydrogen fueling). The hydrogen dispenser 50 may provide the high-pressure hydrogen to the fuel cell vehicles 55. The hydrogen dispenser 50 may operate on demand, or when the hydrogen fueling begins and the demand for high-pressure hydrogen is initiated.

In various embodiments, the system 100 integrates a Proton Exchange Membrane Fuel Cell (PEM FC) 60 stack as part of a hydrogen fueling station/energy forecourt arrangement. The low-pressure hydrogen storage unit 40 may also provide the hydrogen to the PEM FC 60. The hydrogen supply to the PEM FC 60 may be needed only when the PEM FC 60 begins to produce power. The hydrogen passes through the fuel cell and produces instantaneous power. As soon as the hydrogen supply to the PEM FC 60 is stopped, the power generated by the PEM FC 60 also stops. The PEM FC 60 may provide the power that the PEM FC 60 generates to a fast-charge battery electric vehicle (BEV) station 65 and/or may provide the hydrogen as back-up power to a microgrid 70. The PEM FC 60 may provide the power on demand to either or both the fast-charge battery electric vehicle (BEV) station 65 and/or to a microgrid 70. The size of the PEM FC 60 may determine the amount of power the PEM FC 60 may generate from hydrogen. The power generated is in units of KW and each EV will require a certain amount of power (in KW) to charge the EV. Similarly, the size of the PEM FC 60 may dictate how much power can be generated for use in a microgrid. The PEM FC 60 may only produce the same power (KW) for either EV charging or microgrid power generation. Therefore, the system may include one or more PEM FC 60 to handle the calculated, expected or forecasted power demand. In various embodiments, the PEM FC 60 may provide power one at a time to the fast-charge battery electric vehicle (BEV) station 65 and/or to a microgrid 70. However, in various embodiments, the system may include more than one PEM FC 60 to provide multiple, simultaneous EV charging and microgrid power generation. By providing the energy to the microgrid 70, the PEM FC 60 may provide reliable and secure power to several crucial customers during periods of loss of power. As such, the microgrid 70 may provide power to, for example, critical equipment, security systems, emergency services, first responders, etc. The system 100 also utilizes this same PEM FC 60 to provide energy to the fast-charge BEV station 65. In various embodiments, the PEM FC 60 may provide power to the fast-charge BEV station 65, in response to the car's charging equipment requesting power. The fast-charge BEV station 65, once plugged into the car, may control the PEM FC 60 operation and demand requirements. The fast-charge BEV station 65 provides Direct Current (DC) fast-charging capability to emerging Electric Vehicle (EV) charging stations, rather than have the EV charging stations rely solely on grid supplied power. As such, the system may provide great flexibility.

The PEM FC 60 provides many advantages in this system. For example, the PEM FC 60 may provide instantaneous power when needed. The PEM FC 60 does not generate any emissions other than heat and pure water when used with a renewable hydrogen source. The PEM FC 60 is over 50% efficient as compared to other less-efficient traditional sources of small-scale, on-site power generation technologies. The PEM FC 60 can provide direct current (DC) to an EV fast charging station and thus provides a more efficient and a faster means of vehicle battery charging. This is in contrast to a typical EV charging station that, as stated above, typically requires a power inverter to convert power from Alternating Current (AC) to Direct Current (DC) for the charging of automobile batteries.

As discussed above, the PEM FC 60 energy source is hydrogen which provides the advantages of sufficient stored energy for EV charging applications, yet also provides redundant adequate energy storage in the event of an extended power outage. As such, the system may be much more resilient then other single solutions available in the market. Most other power generation technologies that support microgrids cannot provide sufficient redundant stored energy without significant battery storage or significant time needed to start and ramp up power generation. A benefit of the PEM FC 60 is that power generated via a PEM FC 60 is instantaneous. Once hydrogen is introduced into the PEM FC 60, the PEM FC 60 will produce power. This is similar to the fuel cells that are now in many fuel cell cars. When you step on the pedal to accelerate, the hydrogen is introduced into the fuel cell and the hydrogen generates electricity that runs an electric motor in the car. The more hydrogen introduced into the fuel cell, the more power the fuel cell generates, up to its maximum.

The combined forecourt of the system provides microgrid resiliency and the ability to support critical infrastructure during times of natural disaster (e.g., extreme weather events, power outages and other events) that could severely reduce the ability for private and public service entities to operate a typical grid or power source. For example, this system may support critical back-up power applications such as, for example, power to the site infrastructure (typical fueling station), first responders, fire stations, police, hospitals, and other vital emergency service providers. At the same time, the system may also provide either hydrogen or power to charge emergency electric or fuel cell vehicles.

The use of a PEM FC 60 for both fast charging of EVs and back-up power may reduce or eliminate the need for a dedicated back-up power system such as, for example, a natural gas or diesel-powered back-up power genset. Eliminating the need for a dedicated back-up power system may reduce or eliminate the green-house gas (GHG) emissions associated with fossil fuel based back up power, reduce the need for additional capital costs and provide an additional revenue stream for the PEM FC 60 through EV charging fees.

Figure 2:
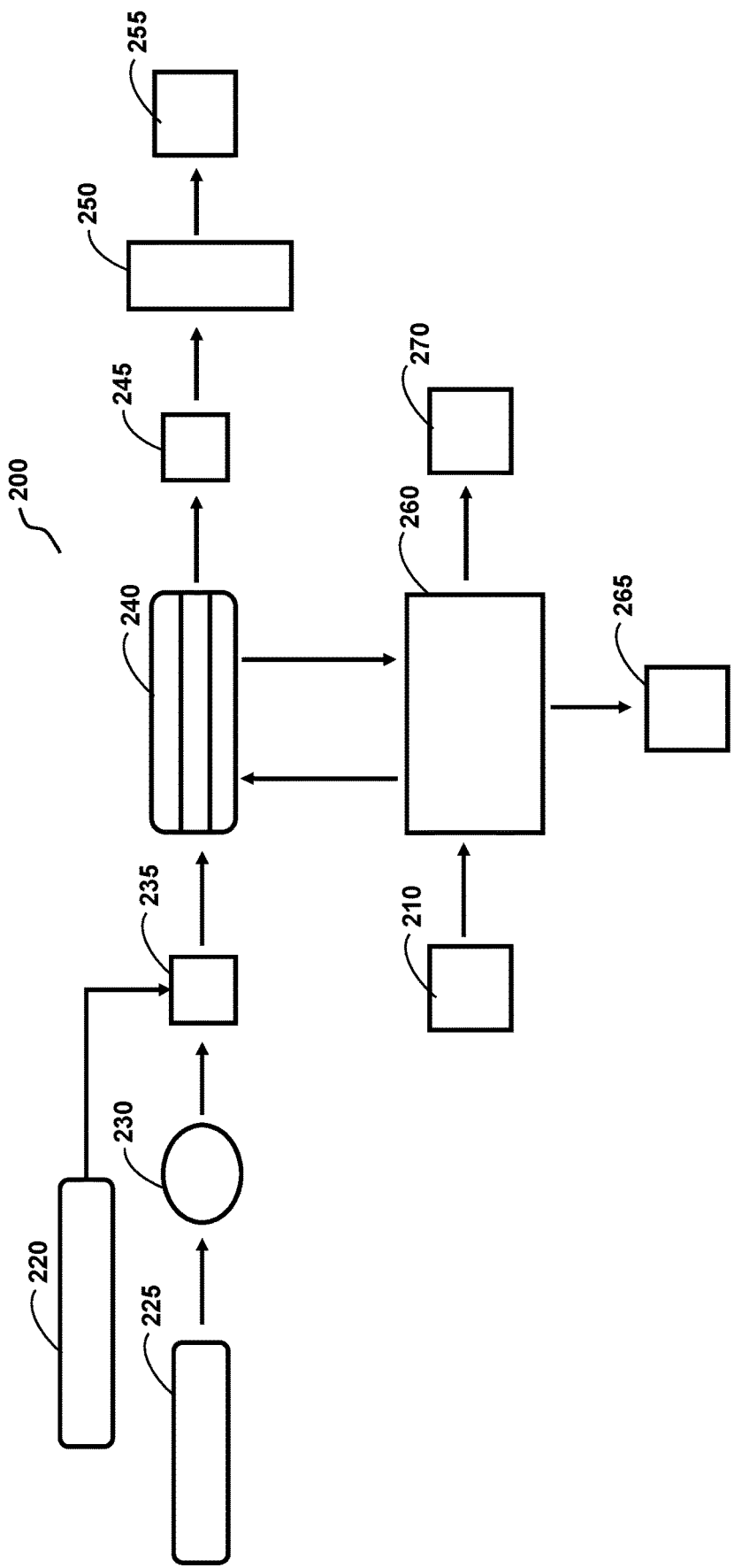
FIG. 2 shows an exemplary second arrangement of the system using a reverse operation approach, in accordance with various embodiments.

In various embodiments, and as set forth in FIG. 2, the system 200 may include a PEM electrolyzer 260 that may be operated in reverse as needed as a PEM FC 60 to provide the power to the fast-charge battery electric vehicle (BEV) station 265 for fast charging of BEVs and/or to the microgrid 270 for back-up power applications. The PEM electrolyzer 260 may perform electrolysis by using one of the power sources 210 to break down the water into low-pressure hydrogen and oxygen, thereby creating hydrogen gas. The system 200 may also contain pumps, vents, storage tanks, a separator and other components. PEM FC 60 may send the low-pressure hydrogen to the low-pressure storage unit 240 for storage. The low-pressure storage unit 240 may send the hydrogen to be compressed at the high-pressure compression unit 245 on site by conventional methods to higher pressure as determined by the vehicle original equipment manufacturer (OEM) requirements for dispensing into fuel cell vehicles. The high-pressure compression unit 245 may deliver this hydrogen to the hydrogen dispenser 250 at any time. In various embodiments, the high-pressure compression unit 245 may deliver this hydrogen to the hydrogen dispenser 250 on an as-needed basis (e.g., during each hydrogen fueling). The hydrogen dispenser 250 may provide the high-pressure hydrogen to the fuel cell vehicles 255. The hydrogen dispenser 250 may operate on demand, or when the hydrogen fueling begins and the demand for high-pressure hydrogen is initiated. Industry standards exist for the hydrogen pressure stored onboard a fuel cell vehicle. As such, the system 200 may set the general hydrogen storage and compression pressures used for the fueling station for various vehicles. In various embodiments, in response to the specific vehicle plugging into the charging station, the vehicle provides information to the system. The vehicle information may help the system determine the hydrogen storage and compression pressures used for the fueling station with that particular vehicle. The stored hydrogen in the low-pressure storage unit 240 can be sent back to the PEM electrolyzer 260. The PEM electrolyzer 260 works as a PEM FC 60 in reverse, so similar to a standard PEM FC 60, once the hydrogen enters the PEM electrolyzer 260, the PEM electrolyzer 260 produces power. The PEM electrolyzer 260 can send the energy to the microgrid 270 to be utilized for on-site customer critical applications such emergency lighting, life safety and security equipment. As such, this resilient system 200 also provides a unique redundant energy platform.

In various embodiments, and with continued reference to FIG. 2, the system 200 may also use hydrogen at the site that is supplied from local sources. The hydrogen may be stored and supplied from a delivery tube trailer 220 and/or liquid hydrogen tank 225. A liquid hydrogen delivery unit 220 may be used in place of the delivery tube trailer 220. When supplied from the liquid hydrogen tank 225, the hydrogen may be sent to a liquid hydrogen storage and vaporization unit 230. The hydrogen from the delivery tube trailer 220 and/or the hydrogen from the liquid hydrogen storage and vaporization unit 230 may be sent to a low-pressure compression unit 235. The low-pressure compression unit 235 may compress the hydrogen and send the compressed hydrogen to the low-pressure hydrogen storage unit 240. The low-pressure storage pressure is typically higher than the pressure as it exists in tube trailers, electrolyzers or vaporized liquid hydrogen. The pressure is typically higher than the pressure of the hydrogen that is being delivered because the higher pressure allows the system to supply the flow of hydrogen to the PEM FC 60, as needed and also be further compressed to higher-pressure to the hydrogen fueling equipment, as needed.

The features and elements discussed herein may be combined in various combinations without exclusivity, unless expressly indicated herein otherwise. These features and elements as well as the operation of the disclosed embodiments will become more apparent in light of the following description and the accompanying figures. The detailed description of various embodiments herein refers to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

Any reference to attached, fixed, connected or the like may include permanent, removable, temporary, partial, full and/or any other possible attachment option. Additionally, any reference to without contact (or similar phrases) may also include reduced contact or minimal contact.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic.

Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

The invention claimed is:

1. A system comprising:
a Proton Exchange Membrane (PEM) electrolyzer that is configured to operate in reverse, as needed, to function as a PEM Fuel Cell (PEM FC) stack;
the PEM electrolyzer is configured to provide power to a fast-charge battery electric vehicle (BEV) station for fast charging of BEVs;
the PEM electrolyzer is further configured to provide energy to a microgrid for back-up power applications;
the PEM electrolyzer is further configured to perform electrolysis by using one or more of power sources to break down water into low-pressure hydrogen and oxygen to create low-pressure hydrogen gas;
the PEM electrolyzer is further configured to send the low-pressure hydrogen gas to a low-pressure storage unit for storage;
the low-pressure storage unit is configured to send the low-pressure hydrogen gas to be compressed at a high-pressure compression unit to high-pressure hydrogen gas at a high-pressure, wherein the high-pressure for hydrogen storage and compression used for a fueling station is determined from vehicle original equipment manufacturer (OEM) requirements for dispensing into fuel cell vehicles, wherein the vehicle OEM requirements are received from a vehicle in response to the vehicle plugging into the BEV station; and
the PEM electrolyzer is further configured to produce power, in response to receiving low-pressure hydrogen from the stored hydrogen in the low-pressure storage unit.

2. The system of claim 1, further comprising one or more power sources that are connected to the PEM electrolyzer, wherein the one or more power sources are configured to supply energy to the PEM electrolyzer, and wherein the power sources include at least one of wind, solar and hydroelectric.

3. The system of claim 1, further comprising a low-pressure compression unit configured to supply the low-pressure hydrogen to the PEM electrolyzer.

4. The system of claim 3, wherein the low-pressure compression unit is connected to and configured to receive the low-pressure hydrogen from at least one of a hydrogen deliver tube trailer, a liquid hydrogen storage and vaporization unit, or a liquid hydrogen delivery unit.

5. The system of claim 3, wherein the low-pressure compression unit is connected to and configured to receive hydrogen from a liquid hydrogen storage and vaporization unit, and wherein a liquid hydrogen delivery unit is connected to and configured to provide hydrogen to the liquid hydrogen storage and vaporization unit.

6. The system of claim 1, further comprising a low-pressure hydrogen storage unit that is connected to the PEM electrolyzer, wherein the low-pressure storage unit is configured to supply the hydrogen to the PEM electrolyzer.

7. The system of claim 1, further comprising a low-pressure hydrogen storage unit that is connected to the PEM electrolyzer and a low-pressure compression unit, wherein the low-pressure storage unit is configured to receive hydrogen from the low-pressure compression unit and is configured to send hydrogen to the PEM electrolyzer.

8. The system of claim 1, further comprising a low-pressure hydrogen storage unit that is connected to the PEM electrolyzer and a high-pressure compression unit.

9. The system of claim 1, further comprising a low-pressure hydrogen storage unit that is connected to the PEM electrolyzer and a high-pressure compression unit, wherein the high-pressure compression unit is further connected to the hydrogen dispenser that is configured to dispense hydrogen to one or more FCVs.

10. The system of claim 1, wherein the PEM FC is further configured to include an electrolyzer.

11. A method comprising:
operating, by a Proton Exchange Membrane (PEM) electrolyzer, in reverse, as needed, to function as a PEM Fuel Cell (PEM FC) stack;
providing, by the PEM electrolyzer, power to a fast-charge battery electric vehicle (BEV) station for fast charging of BEVs;
providing, by the PEM electrolyzer energy to a microgrid for back-up power applications;
performing, by the PEM electrolyzer, electrolysis by using one or more of power sources to break down water into low-pressure hydrogen and oxygen to create low-pressure hydrogen gas;
receiving vehicle original equipment manufacturer (OEM) requirements from a vehicle, in response to the vehicle plugging into the BEV station;
determining high-pressure for hydrogen storage and compression used for a fueling station from the vehicle OEM requirements for dispensing into fuel cell vehicles;
sending, by the PEM electrolyzer, the low-pressure hydrogen gas to a low-pressure storage unit for storage, wherein the low-pressure storage unit sends the low-pressure hydrogen gas to be compressed at a high-pressure compression unit to high-pressure hydrogen gas at the high-pressure; and
producing, by the PEM electrolyzer, power, in response to receiving low-pressure hydrogen from the stored hydrogen in the low-pressure storage unit.

12. The method of claim 11, further comprising supplying, by one or more power sources, energy to the PEM electrolyzer, wherein the one or more power sources are connected to the PEM electrolyzer, and wherein the one or more power sources include at least one of wind, solar or hydroelectric.

13. The method of claim 11, further comprising supplying, by a low-pressure compression unit, the hydrogen to the PEM electrolyzer.

14. The method of claim 11, further comprising receiving the low-pressure hydrogen from at least one of a hydrogen deliver tube trailer, a liquid hydrogen storage and vaporization unit, or a liquid hydrogen delivery unit.

15. A system comprising:
a Proton Exchange Membrane (PEM) electrolyzer configured to provide power to a battery electric vehicle (BEV) station for charging of BEVs;
the PEM electrolyzer is further configured to provide energy to a microgrid for back-up power applications; and
wherein the PEM electrolyzer is further configured to perform electrolysis by using one or more of power sources to break down water into low-pressure hydrogen and oxygen to create low-pressure hydrogen gas.

16. The system of claim 15, further comprising a low-pressure hydrogen storage unit that is connected to at least one of:
the PEM electrolyzer, wherein the low-pressure hydrogen storage unit is configured to supply the hydrogen to the PEM electrolyzer;
the PEM electrolyzer and a low-pressure compression unit, wherein the low-pressure storage unit is configured to receive hydrogen from the low-pressure compression unit;
the PEM electrolyzer and a low-pressure compression unit, wherein the low-pressure storage unit is configured to send hydrogen to the PEM electrolyzer;
the PEM electrolyzer and a high-pressure compression unit; or
the PEM electrolyzer and a high-pressure compression unit, wherein the high-pressure compression unit is further connected to a hydrogen dispenser that is configured to dispense hydrogen to one or more FCVs.

17. The system of claim 15, wherein the PEM electrolyzer is configured to operate in reverse, as needed, to function as a PEM Fuel Cell (PEM FC) stack.

18. The system of claim 15, wherein the PEM electrolyzer is further configured to send the low-pressure hydrogen gas to a low-pressure storage unit for storage.

19. The system of claim 18, wherein the low-pressure storage unit is configured to send the low-pressure hydrogen gas to be compressed at a high-pressure compression unit to high-pressure hydrogen gas at a high-pressure.

20. The system of claim 19, wherein the high-pressure for hydrogen storage and compression used for a fueling station is determined from vehicle original equipment manufacturer (OEM) requirements for dispensing into fuel cell vehicles.

* * * * *